United States Patent
Lopes et al.

(10) Patent No.: US 9,248,782 B2
(45) Date of Patent: Feb. 2, 2016

(54) PIVOT TRAY ASSEMBLY AND PROCESS OF MAKING AND USING THE SAME

(71) Applicant: GM Global Technology Operations LLC, Detroit, MI (US)

(72) Inventors: Jeferson Pereira Lopes, Santo Andre (BR); Eduardo Horvat Lofrano, Santo Andre (BR)

(73) Assignee: GM Global Technology Operations LLC, Detroit, MI (US)

(*) Notice: Subject to any disclaimer, the term of this patent is extended or adjusted under 35 U.S.C. 154(b) by 49 days.

(21) Appl. No.: 14/250,905

(22) Filed: Apr. 11, 2014

(65) Prior Publication Data

US 2015/0291103 A1    Oct. 15, 2015

(51) Int. Cl.
*B60R 5/04*    (2006.01)

(52) U.S. Cl.
CPC ..................................... *B60R 5/044* (2013.01)

(58) Field of Classification Search
CPC .... B60R 7/04; B60R 13/013; B60R 13/0206; B60R 13/0268; B60R 5/044; B60R 5/045
USPC .................................. 296/24.43, 24.44, 37.16
See application file for complete search history.

(56) References Cited

U.S. PATENT DOCUMENTS

| 5,037,154 | A  | * | 8/1991 | Senba et al. | ............... | 296/37.16 |
| 6,546,598 | B1 | * | 4/2003 | Nakanou et al. | ............... | 224/281 |
| 8,172,295 | B2 | * | 5/2012 | Fischer et al. | ............. | 296/24.43 |
| 2012/0133171 | A1 | * | 5/2012 | Honda et al. | ............... | 296/37.16 |
| 2015/0102622 | A1 | * | 4/2015 | Horst et al. | ................ | 296/24.43 |

FOREIGN PATENT DOCUMENTS

WO    WO-2011145694 A1 * 11/2011

* cited by examiner

*Primary Examiner* — Jason S Morrow
(74) *Attorney, Agent, or Firm* — BrooksGroup

(57) ABSTRACT

A number of variations may include a product including a tray comprising at least one face, at least one edge, and at least one female attachment, and a frame comprising an outline comprising a plurality of sides and at least one male attachment, wherein the male attachment of the frame attaches to the female attachment along the edge of the tray, wherein the female attachment comprises a deformable spring assembly constructed and arranged to both rotate the tray about the male attachment, and hold or maintain the tray face in a parallel or perpendicular direction with respect to the outline of the frame.

16 Claims, 5 Drawing Sheets

US 9,248,782 B2

PIVOT TRAY ASSEMBLY AND PROCESS OF MAKING AND USING THE SAME

TECHNICAL FIELD

The field to which the disclosure generally relates to includes tray assemblies and processes of making and using the same.

BACKGROUND

Currently, some vehicles have storage components and assemblies thereof that may be capable of forming compartments in or on the interior or exterior of the vehicle.

SUMMARY OF ILLUSTRATIVE VARIATIONS OF THE INVENTION

A number of variations may include a product including a tray comprising at least one face, at least one edge, and at least one female attachment, and a frame comprising an outline comprising a plurality of sides and at least one male attachment, wherein the male attachment of the frame attaches to the female attachment along the edge of the tray, wherein the female attachment comprises a deformable spring assembly constructed and arranged to both rotate the tray about the male attachment, and hold or maintain the tray face in a parallel or perpendicular direction with respect to the outline of the frame.

A number of variations may include a method including providing a tray comprising at least one face, at least one edge, and at least one female attachment; providing a frame comprising an outline comprising a plurality of sides, and at least one male attachment; attaching the male attachment of the frame to the female attachment along the edge of the tray, wherein the female attachment comprises a deformable spring assembly constructed and arranged to both rotate the tray about the male attachment, and hold or maintain the tray face in a parallel or perpendicular direction with respect to the outline of the frame.

Other illustrative variations within the scope of the invention will become apparent from the detailed description provided hereinafter. It should be understood that the detailed description and specific examples, while disclosing optional variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the invention, its application, or uses.

Figure 1:
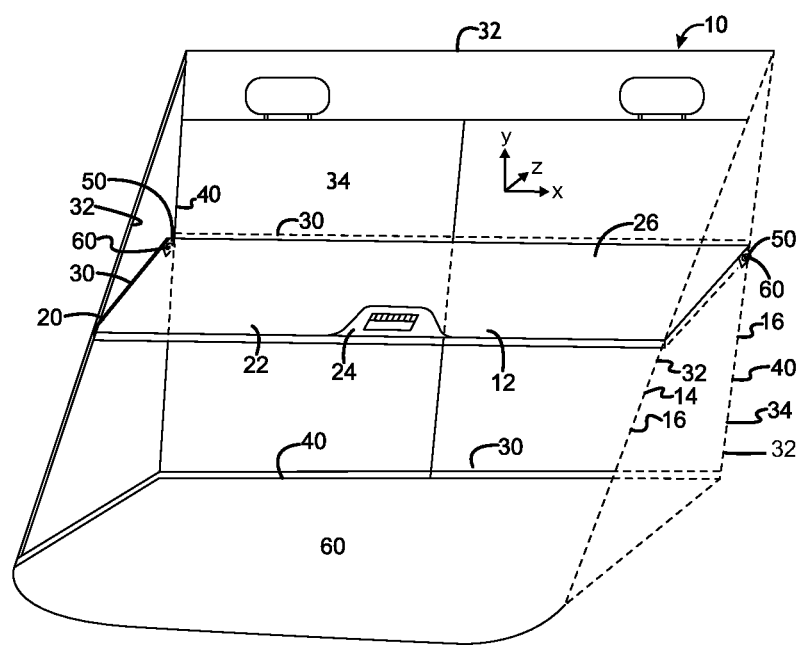
FIG. 1 is an illustration of a product according to a number of variations.

FIG. 1 shows an illustration of a product 10 according to a number of variations. In a number of variations, the product 10 may include a tray 12. In a number of variations, the tray 12 may be rigid to support a load. In a number of variations, the tray 12 may be adjustable, rotatable, bendable, and/or flexible. In a number of variations, the tray 12 may comprise at least one edge 20. In a number of variations, the tray 12 may comprise at least one face 22. In a number of variations, the product 10 may include a frame 14. In a number of variations, the frame 14 may be adjustable, bendable, and/or flexible. In a number of variations, the frame 14 may be rigid to support a load. In a number of variations, the frame 14 may be set in an x-y-z plane and form a 3-dimensional shape including, but not limited to, a cube, cuboid, cone, cylinder, or polygonal 2-D shape with depth in the z direction. In a number of variations, the frame 14 may include sides 32 in the x-y direction, with depth of the frame 14 in the z direction. In a number of variations, the cross-sectional sides 32 of the frame 14 may form an outline 16 of the frame 14 defining a space. In a number of variations, the frame 14 may comprise at least one groove 30 along the z direction. In a number of variations, the groove 30 may be constructed and arranged for accepting an edge 20 of the tray 12. In a number of variations, the tray 12 may be constructed and arranged to form a compartment within a partially enclosed space at least partially defined by the frame 14. In a number of variations, the tray 12 may be constructed and arranged to form a plurality of compartments within a partially enclosed space at least partially defined by the frame 14. In a number of variations, the tray 12 may comprise a female attachment 50. In a number of variations, the frame may comprise a male attachment 60. In a number of variations, the male attachment 60 of the frame 14 attaches to the female attachment 50 along the edge 20 of the tray 12. In a number of variations, the female attachment 50 comprises a deformable spring assembly 52 constructed and arranged to both rotate the tray 12 about the male attachment 60, and hold or maintain the tray face 22 in a parallel or perpendicular direction with respect to the outline 16 of the frame 14. In a number of variations, the tray 12 face 22 may be perpendicular with respect to the outline 16 of the frame 14. This may be referred to as a "stowed" position. In a number of variations, the tray 12 face 22 may be parallel with respect to the outline 16 of the frame 14. This may be referred to as an "open" position. In a number of variations, the tray 12 may be configured to rotate between the deployed and stowed positions.

Figure 5:
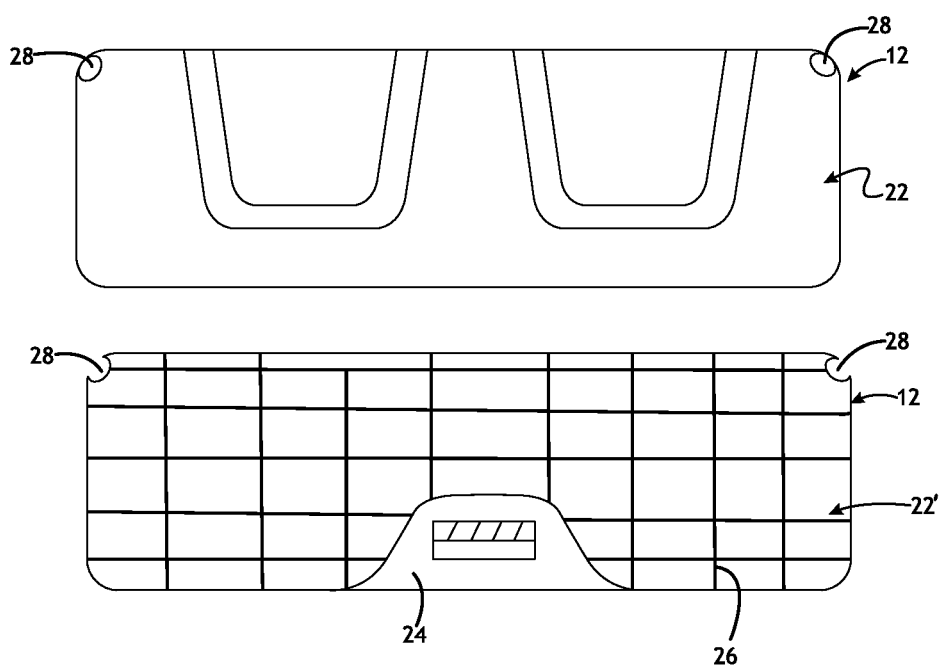
FIG. 5 is an illustration of a product according to a number of variations.

Still referring to FIG. 1 and now referring to FIG. 5, in a number of variations, the tray 12 may comprise a plurality of faces 22, 22'. In a number of variations, the tray 12 may include a series of crevices and ridges 26 according to the applications of the tray 12. In a number of variations, the tray may comprise at least one notch 28 for accepting a female attachment 60. In a number of variations, the tray 12 may include a handle 24. In a number of variations, the tray 12 may include the handle 24 and/or the crevices and ridges 26 on both faces 22, 22' of the tray 12. In a number of variations, the tray 12 may include a plurality of handles 24 on either face 22, 22' of the tray 12. In a number of variations, the tray 12 may comprise a plurality of foldable legs (35) (not shown) capable of forming the tray 12 into a table.

Still referring to FIGS. 1 and 5, in a number of variations, the tray 12 may comprise a polymeric material. In a number of variations, the tray 12 may comprise a ceramic material. In a number of variations, the tray 12 may comprise a metal. In a number of variations, the tray 12 may comprise a fibrous material. In a number of variations, the tray 12 may comprise a plastic. In a number of variations, the tray 12 may comprise a material including, but not limited to, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polyacrylonitrile, PVB, silicone, bioplastic, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), combinations thereof, or may be another type. In a number of variations, the tray 12 may comprise a package shelf for a vehicle including, but not limited to, an automobile, plane, train, motorcycle, aircraft, watercraft, or spacecraft.

Figure 2:
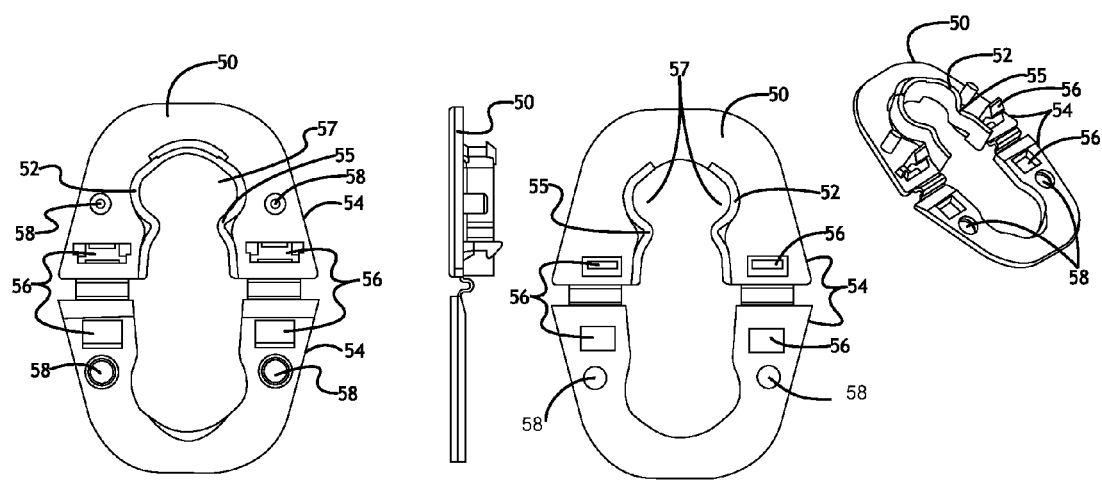
FIG. 2 is an illustration of a product according to a number of variations.
Figure 3:
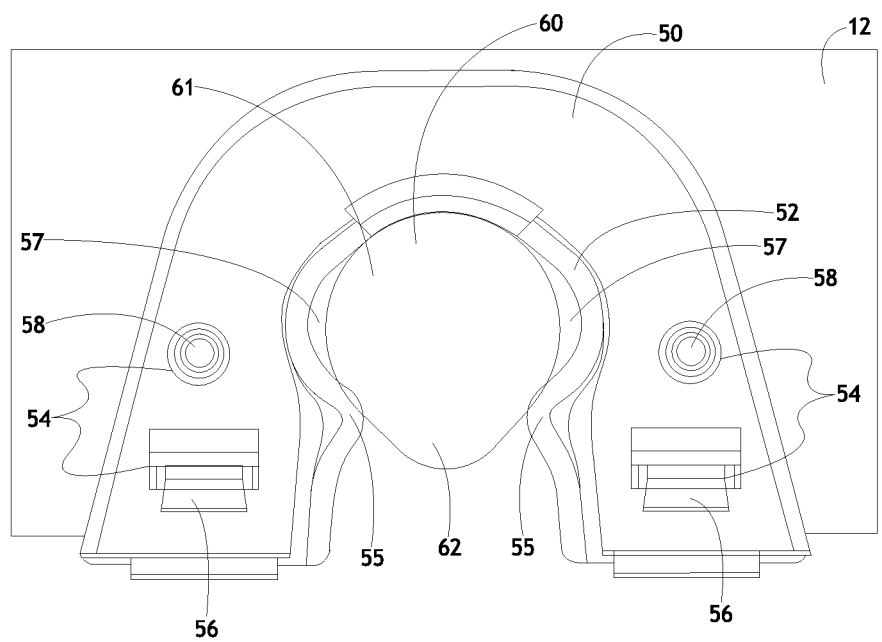
FIG. 3 is an illustration of a product according to a number of variations.

Still referring to FIG. 1 and now referring to FIGS. 2-3, in a number of variations, the tray 12 may comprise a female attachment 50. In a number of variations, the female attachment may comprise a deformable spring assembly 52 constructed and arranged to both rotate the tray 12 about the male attachment 60 and hold, maintain or lock the tray face 22 in a parallel or perpendicular direction with respect to the outline of the frame 14. In a number of variations, the spring assembly 52 fits into the notch 28 of the tray 12. In a number of variations, the female attachment 50 may comprise a polymeric material. In a number of variations, the female attachment 50 may comprise any of the materials that may comprise the tray 12 in any combination. In a number of variations, the spring assembly 52 may comprise a horseshoe shape with at least one pinch point 55. In a number of variations, the spring assembly 52 may comprise a horseshoe shape with at least one recess 57. In a number of variations, the spring assembly 52 may comprise a plurality of pinch points 55 and recesses 57. In a number of variations, the female attachment 50 may comprise a mechanical locking assembly 54. In a number of variations, the mechanical locking assembly 54 may attach the female attachment 50 to the tray 12. In a number of variations, the mechanical locking assembly 54 may comprise a ledge locking mechanism 56. In a number of variations, the mechanical locking assembly 54 may comprise a pinhole locking mechanism 58. As best understood in FIGS. 1 and 3, in a number of variations, the pinhole locking mechanism 58 and/or the ledge locking mechanism 56 may be joined to form and attach the female attachment 50 to the tray 12.

Still referring to FIG. 1, in a number of variations, the frame 14 may include at least one side 32. In a number of variations, the frame 14 may include a well 60 at the base of the frame 14. In a number of variations, the frame 14 may comprise a polymeric material. In a number of variations, the frame 14 may comprise a ceramic material. In a number of variations, the frame 14 may comprise a metal. In a number of variations, the frame 14 may comprise a fibrous material. In a number of variations, the frame 14 may comprise a plastic. In a number of variations, the frame 14 may comprise a material including, but not limited to, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polyacrylonitrile, PVB, silicone, bioplastic, PET, PP, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, leather, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), combinations thereof, or may be another type. In a number of variations, the frame 14 may comprise the interior trim of a vehicle including, but not limited to, an automobile, plane, train, motorcycle, aircraft, watercraft, or spacecraft. In a number of variations, the frame 14 may comprise the exterior trim of a vehicle including, but not limited to, an automobile, plane, train, motorcycle, aircraft, watercraft, or spacecraft. In a number of variations, the frame 14 may further comprise a backing 34. In a number of variations, the backing 34 may be rigid. In a number of variations, the backing 34 may be adjustable, foldable, bendable, and/or flexible. In a number of variations, the backing 34 may comprise at least one edge 40. In a number of variations, the frame 14 may comprise the rear interior of a vehicle trim. In a number of variations, the backing 34 may comprise the rear of a vehicle seat. In a number of variations, the frame 14 may comprise grooves in the z direction, perpendicular to the outline 16 of the frame 14.

Referring again to FIG. 1 and FIG. 3, in a number of variations, the frame 14 may comprise a male attachment 60. In a number of variations, the male attachment 60 may comprise a knob 61 having a cross-section comprising a circle with at least one eccentric axis 62. In a number of variations, the male attachment 60 may comprise a knob 61 having a cross-section comprising a circle with a plurality of eccentric axes 62. In a number of variations, the knob 61 cross-section may comprise an oval with at least one eccentric axis 62. In a number of variations, the male attachment 60 may comprise a knob 61 having a cross-section comprising an oval with a plurality of eccentric axes 62. In a number of variations, the male attachment 60 may be attached to the frame 14 mechanically by lock. In a number of variations, the male attachment 60 may be molded into or onto the frame 14. In a number of variations, the male attachment 60 may comprise a polymeric material. In a number of variations, the male attachment 60 may comprise any of the materials that may comprise the frame 14 in any combination.

Figure 4:
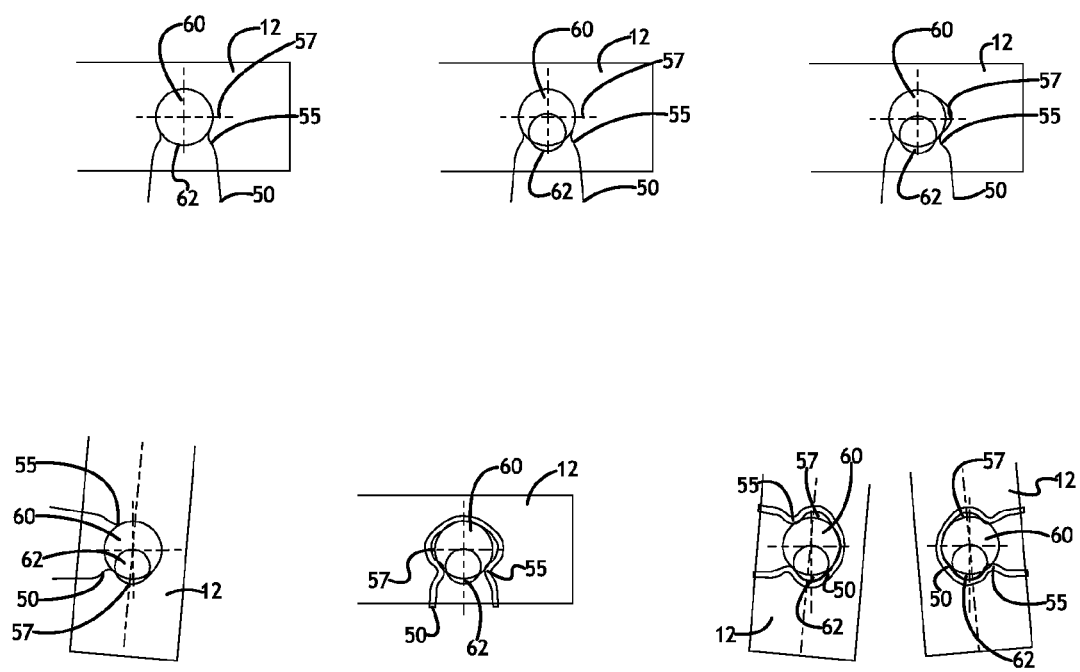
FIG. 4 is an illustration of a product and method according to a number of variations.

Referring to FIGS. 3-4, in a number of variations, the tray 12 may rotate about the male attachment 60 via the female attachment 50. In a number of variations, the tray 12 may rotate from an open to a stowed position or vice versa. In a number of variations, when the tray 12 may be rotated, the female attachment 50 may allow the eccentric axis 62 of the male attachment 60 to pass through a pinch point 55 in the spring assembly 52. The spring assembly 52 of the female attachment 50 may temporarily deform as a result as the eccentric axis 62 passes over the pinch point 55. In a number of variations, after the eccentric axis 62 passes over the pinch point 55, the eccentric axis 62 will be accommodated by a recess 57 within the spring assembly 52. This may keep the tray 12 locked into a rigid position where it will rest parallel or perpendicular to the outline 16 of the frame. The tray 12 may be moved to the open or stowed position or back in this way. As shown in FIG. 3, the interface between the male attachment 60 and the female attachment 50 may be accomplished on more than one edge 20 of the tray 12.

In a number of variations, a method 200 may be shown wherein the method includes providing a tray 12 comprising at least one face 22, at least one edge 20, and at least one female attachment 50. The method further includes providing a frame 14 comprising an outline 16 comprising a plurality of sides 32 and at least one male attachment 60. The method further includes attaching the male attachment 60 of the frame 14 to the female attachment 50 along the edge 20 of the tray 12, wherein the female attachment 50 comprises a deformable spring assembly 52 constructed and arranged to both rotate the tray 12 about the male attachment 60, and hold or maintain the tray face 22 in a parallel or perpendicular direction with respect to the outline 16 of the frame 14. In a number of variations, the method 200 may further include rotating the tray 12 about the male attachment 60 into a position parallel with respect to the outline 16 of the frame 14. In a number of variations, the method 200 may further include maintaining, holding, and/or locking the tray 12 into a position parallel with respect to the outline 16 of the frame 14. In a number of variations, the method 200 may further include rotating the tray 12 about the male attachment 60 into a position perpendicular with respect to the outline 16 of the frame 14. In a number of variations, the method 200 may further include maintaining, holding, and/or locking the tray 12 into a position perpendicular with respect to the outline 16 of the frame 14.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product including a tray comprising at least one face, at least one edge, and at least one female attachment, and a frame comprising an outline comprising a plurality of sides and at least one male attachment, wherein the male attachment of the frame attaches to the female attachment along the edge of the tray, wherein the female attachment comprises a deformable spring assembly constructed and arranged to both rotate the tray about the male attachment, and hold or maintain the tray face in a parallel or perpendicular direction with respect to the outline of the frame.

Variation 2 may include a product as set forth in Variation 1 wherein the male attachment comprises a knob having a cross-section comprising a circle with at least one eccentric axis.

Variation 3 may include a product as set forth in any of Variations 1-2 wherein the male attachment is molded onto or into the frame.

Variation 4 may include a product as set forth in any of Variations 1-3 wherein the tray comprises a package shelf.

Variation 5 may include a product as set forth in any of Variations 1-4 wherein the frame comprises the interior trim of a vehicle.

Variation 6 may include a product as set forth in any of Variations 1-5 wherein the spring assembly comprises a horseshoe shape further comprising a plurality of pinch points.

Variation 7 may include a product as set forth in any of Variations 1-6 wherein the female attachment comprises a polymeric material.

Variation 8 may include a product as set forth in any of Variations 1-7 wherein the male attachment comprises a polymeric material.

Variation 9 may include a product as set forth in any of Variations 1-8 wherein the frame further comprises grooves perpendicular to the outline of the frame.

Variation 10 may include a product as set forth in any of Variations 1-9 wherein the female attachment is attached to the tray by a mechanical locking assembly.

Variation 11 may include a method including providing a tray comprising at least one face, at least one edge, and at least one female attachment; providing a frame comprising an outline comprising a plurality of sides and at least one male attachment; attaching the male attachment of the frame to the female attachment along the edge of the tray, wherein the female attachment comprises a deformable spring assembly constructed and arranged to both rotate the tray about the male attachment, and hold or maintain the tray face in a parallel or perpendicular direction with respect to the outline of the frame.

Variation 12 may include a method as set forth in Variation 11 wherein the male attachment comprises a knob having a cross-section comprising a circle with at least one eccentric axis.

Variation 13 may include a method as set forth in any of Variations 11-12 wherein the male attachment is molded onto or into the frame.

Variation 14 may include a method as set forth in any of Variations 11-13 wherein the tray comprises a package shelf.

Variation 15 may include a method as set forth in any of Variations 11-14 wherein the frame comprises the interior trim of a vehicle.

Variation 16 may include a method as set forth in any of Variations 11-15 wherein the spring assembly comprises a horseshoe shape further comprising a plurality of pinch points.

Variation 17 may include a method as set forth in any of Variations 11-16 wherein the female attachment comprises polymeric material.

Variation 18 may include a method as set forth in any of Variations 11-17 wherein the male attachment comprises polymeric material.

Variation 19 may include a method as set forth in any of Variations 11-18 wherein the method further includes rotating the tray into a position parallel with respect to the outline of the frame, and thereafter maintaining the tray in a position perpendicular with respect to the outline of the frame.

Variation 20 may include a method as set forth in any of Variations 11-19 wherein method further includes rotating the tray into a position perpendicular with respect to the outline of the frame, and thereafter maintaining the tray in a position perpendicular with respect to the outline of the frame.

Variation 21 may include a method, and/or a product as set forth in any of Variations 1-20 the tray is rigid to support a load.

Variation 22 may include a method, and/or a product as set forth in any of Variations 1-21 wherein the tray is adjustable, bendable, and/or flexible.

Variation 23 may include a method, and/or a product as set forth in any of Variations 1-22 wherein the frame is rigid to support a load.

Variation 24 may include a method, and/or a product as set forth in any of Variations 1-23 wherein the frame is adjustable, bendable, and/or flexible.

Variation 25 may include a method, and/or a product as set forth in any of Variations 1-24 wherein the frame is set in an x-y-z plane and forms a 3-dimensional shape including, but not limited to, a cube, cuboid, cone, cylinder, or polygonal 2-D shape with depth in the z direction.

Variation 26 may include a method, and/or a product as set forth in any of Variations 1-25 wherein the tray is constructed and arranged to form a compartment within a partially enclosed space at least partially defined by the frame.

Variation 26 may include a method, and/or a product as set forth in any of Variations 1-25 wherein the tray is constructed and arranged to form a plurality of compartments within a partially enclosed space at least partially defined by the frame.

Variation 27 may include a method, and/or a product as set forth in any of Variations 1-26 wherein the tray is constructed and arranged to form a compartment within a partially enclosed space at least partially defined by the frame.

Variation 28 may include a method, and/or a product as set forth in any of Variations 1-27 wherein the tray includes a series of crevices and ridges.

Variation 29 may include a method, and/or a product as set forth in any of Variations 1-28 wherein the tray comprises at least one notch for accepting a female attachment.

Variation 30 may include a method, and/or a product as set forth in any of Variations 1-29 wherein the tray includes at least one handle Variation 31 include a method, and/or a product as set forth in any of Variations 1-30 wherein the tray comprises a plurality of foldable legs.

Variation 32 may include a method, and/or a product as set forth in any of Variations 1-31 wherein the tray includes a series of crevices and ridges.

Variation 33 may include a method, and/or a product as set forth in any of Variations 1-32 wherein the tray comprises a polymeric material.

Variation 34 may include a method, and/or a product as set forth in any of Variations 1-33 wherein the tray comprises a ceramic material.

Variation 35 may include a method, and/or a product as set forth in any of Variations 1-34 wherein the tray comprises a metal.

Variation 36 may include a method, and/or a product as set forth in any of Variations 1-35 wherein the tray comprises a fibrous material.

Variation 37 may include a method, and/or a product as set forth in any of Variations 1-36 wherein the tray comprises a metal.

Variation 38 may include a method, and/or a product as set forth in any of Variations 1-37 wherein the tray comprises a material including shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polyacrylonitrile, PVB, silicone, bioplastic, PET, PP, PVDC, PA PTFE, PEO, PPY, PANI, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), combinations thereof.

Variation 39 may include a method, and/or a product as set forth in any of Variations 1-38 wherein the female attachment comprises a polymeric material.

Variation 40 may include a method, and/or a product as set forth in any of Variations 1-39 wherein the female attachment comprises any of the materials that comprise the tray in any combination.

Variation 41 may include a method, and/or a product as set forth in any of Variations 1-40 wherein the female attachment comprises at least one recess Variation 42 may include a method, and/or a product as set forth in any of Variations 1-41 wherein the female attachment comprises a plurality of pinch points and recesses.

Variation 43 may include a method, and/or a product as set forth in any of Variations 10-42 wherein the mechanical locking assembly comprises a ledge locking mechanism Variation 44 may include a method, and/or a product as set forth in any of Variations 10-43 wherein the mechanical locking assembly comprises a pinhole locking mechanism.

Variation 45 may include a method, and/or a product as set forth in any of Variations 1-44 wherein the frame further comprises a well at the base of the frame.

Variation 46 may include a method, and/or a product as set forth in any of Variations 1-45 wherein the frame comprises a polymeric material.

Variation 47 may include a method, and/or a product as set forth in any of Variations 1-46 wherein the frame comprises a ceramic material.

Variation 48 may include a method, and/or a product as set forth in any of Variations 1-47 wherein the frame comprises a metal.

Variation 49 may include a method, and/or a product as set forth in any of Variations 1-48 wherein the frame comprises a fibrous material.

Variation 50 may include a method, and/or a product as set forth in any of Variations 1-49 wherein the frame comprises a plastic.

Variation 51 may include a method, and/or a product as set forth in any of Variations 1-50 wherein the frame comprises shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polyacrylonitrile, PVB, silicone, bioplastic, PET, PP, PVDC, PA PTFE, PEO, PPY, PANI, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, leather, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, tri-acetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), or combinations thereof.

Variation 52 may include a method, and/or a product as set forth in any of Variations 1-51 wherein the frame comprises the interior trim of a vehicle including, but not limited to, an automobile, plane, train, motorcycle, aircraft, watercraft, or spacecraft.

Variation 53 may include a method, and/or a product as set forth in any of Variations 1-52 wherein the frame comprises the exterior trim of a vehicle including, but not limited to, an automobile, plane, train, motorcycle, aircraft, watercraft, or spacecraft.

Variation 54 may include a method, and/or a product as set forth in any of Variations 1-53 wherein backing is rigid.

Variation 55 may include a method, and/or a product as set forth in any of Variations 1-54 wherein the backing is adjustable, foldable, bendable, and/or flexible.

Variation 56 may include a method, and/or a product as set forth in any of Variations 1-55 wherein the backing comprises at least one edge.

Variation 57 may include a method, and/or a product as set forth in any of Variations 1-56 wherein backing comprises the rear of a vehicle seat.

Variation 58 may include a method, and/or a product as set forth in any of Variations 1-57 wherein the frame comprises the rear interior of a vehicle trim.

Variation 59 may include a method, and/or a product as set forth in any of Variations 1-58 wherein the frame comprises the rear exterior of a vehicle trim.

Variation 56 may include a method, and/or a product as set forth in any of Variations 1-55 wherein the male attachment cross-section comprises an oval with at least one eccentric axis.

Variation 57 may include a method, and/or a product as set forth in any of Variations 1-56 wherein male attachment cross section comprises multiple eccentric axes.

Variation 58 may include a method, and/or a product as set forth in any of Variations 1-57 wherein the male attachment is attached to the frame mechanically by lock.

Variation 59 may include a method, and/or a product as set forth in any of Variations 1-58 wherein the male attachment comprises a polymeric material.

Variation 60 may include a method, and/or a product as set forth in any of Variations 1-59 wherein the male attachment comprises any of the materials that comprise the frame in any combination.

Variation 61 may include a method, and/or a product as set forth in any of Variations 1-60 wherein the tray is rotated to allow the eccentric axis of the male attachment of the frame to pass through a pinch point in the spring assembly into a recess in the spring assembly Variation 62 may include a method, and/or a product as set forth in any of Variations 1-61 wherein male attachment may rest within a recess of the spring assembly to lock the tray into a rigid position where it will rest parallel or perpendicular to the outline of the frame.

Variation 63 may include a method, and/or a product as set forth in any of Variations 1-62 wherein the male attachment is attached to the frame mechanically by lock.

Variation 64 may include a method, and/or a product as set forth in any of Variations 1-63 wherein the male attachment comprises a polymeric material.

Variation 65 may include a method, and/or a product as set forth in any of Variations 1-64 wherein the male attachment comprises any of the materials that comprise the frame in any combination.

The above description of select examples of the invention is merely exemplary in nature and, thus, variations or variants thereof are not to be regarded as a departure from the spirit and scope of the invention.

What is claimed is:

1. A product comprising: a tray comprising at least one face, at least one edge, and at least one female attachment, and a frame comprising an outline comprising a plurality of sides and at least one male attachment comprising a knob having a cross-section comprising a circle with at least one eccentric axis, wherein the male attachment of the frame attaches to the female attachment along the edge of the tray, wherein the female attachment comprises a deformable spring assembly comprising a horseshoe shape further comprising a plurality of pinch points and constructed and arranged to both rotate the tray about the male attachment, and hold or maintain the tray face in a parallel or perpendicular direction with respect to the outline of the frame.

2. A product as set forth in claim 1 wherein the male attachment is molded onto or into the frame.

3. A product as set forth in claim 1 wherein the tray comprises a package shelf.

4. A product as set forth in claim 1 wherein the frame comprises the interior trim of a vehicle.

5. A product as set forth in claim 1 wherein the female attachment comprises a polymeric material.

6. A product as set forth in claim 1 wherein the male attachment comprises a polymeric material.

7. A product as set forth in claim 1 wherein the frame further comprises grooves perpendicular to the outline of the frame.

8. A product as set forth in claim 1 wherein the female attachment is attached to the tray by a mechanical locking assembly.

9. A method comprising:
providing a tray comprising at least one face, at least one edge, and at least one female attachment;
providing a frame comprising an outline comprising a plurality of sides and at least one male attachment comprising a knob having a cross-section comprising a circle with at least one eccentric axis;
attaching the male attachment of the frame to the female attachment along the edge of the tray, wherein the female attachment comprises a deformable spring assembly comprising a horseshoe shape further comprising a plurality of pinch points and constructed and arranged to both rotate the tray about the male attachment, and hold or maintain the tray face in a parallel or perpendicular direction with respect to the outline of the frame.

10. A method as set forth in claim 9 wherein the male attachment is molded onto or into the frame.

11. A method as set forth in claim 9 wherein the tray comprises a package shelf.

12. A method as set forth in claim 9 wherein the frame comprises the interior trim of a vehicle.

13. A method as set forth in claim 9 wherein the female attachment comprises a polymeric material.

14. A method as set forth in claim 9 wherein the male attachment comprises a polymeric material.

15. A method as set forth in claim 9 wherein the method further comprises rotating the tray into a position parallel with respect to the outline of the frame, and thereafter maintaining the tray in a position perpendicular with respect to the outline of the frame.

16. A method as set forth in claim 9 wherein method further comprises rotating the tray into a position perpendicular with respect to the outline of the frame, and thereafter maintaining the tray in a position perpendicular with respect to the outline of the frame.

\* \* \* \* \*